UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

COMPOUND OF ACETYL CELLULOSE AND PROCESS OF MAKING SUCH COMPOUND.

1,041,115.      Specification of Letters Patent.      Patented Oct. 15, 1912.

No Drawing.      Application filed November 27, 1911. Serial No. 662,741.

*To all whom it may concern:*

Be it known that I, WILLIAM G. LINDSAY, a citizen of the United States, residing in Caldwell, county of Essex, State of New Jersey, have invented certain new and useful Improvements in Compounds of Acetyl Cellulose and Processes of Making Such Compounds, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base—acetyl cellulose.

It has long been known that camphor mixed with nitrocellulose becomes a solvent of the nitrocellulose in the cold when ethyl alcohol is added to a mixture of these two substances. I have found, however, that when that process is applied to acetyl cellulose, no solvent action takes place in the cold or at the ordinary temperature of the room, and the object of my invention was to find substances which, when added to the acetyl cellulose, would exert a solvent action upon the cellulose and produce a plastic mass which could be worked in a manner analogous to nitrocellulose—camphor compounds, and in addition thereto decrease the inflammability of the resulting composition.

In the course of my experiments I have found that a mixture of camphor and methyl alcohol and triphenyl-phosphate, and a mixture of camphor and methyl alcohol and tricresylphosphate or a similar substance, in proper admixture will not only dissolve acetyl cellulose of the variety which is soluble in acetone in the cold, or at room temperature, when used in certain proportions, but will render the product practically non-inflammable. The proportions are important in the practice of the invention.

As one example of carrying out my invention, I take 100 parts of an acetyl cellulose which is soluble in acetone and grind it or otherwise mix it with from, say, 15 to 30 parts of camphor and about 10 to 20 parts of either triphenylphosphate or tricresylphosphate, so that there is a thorough mixture of the ingredients. I then add from about 40 to 50 parts of methyl alcohol and stir until a substantially uniform mixture is produced. I then allow the mass to soak or macerate at room temperature in a closed vessel for from, say, 18 hours to a longer time, until gelatinization has taken place. The mass can then be worked in a heated press, or upon rolls, or in a stuffer, as is customary in making nitrocellulose compounds.

The essence of my invention lies in the discovery that while a mixture of ethyl alcohol and camphor is not a solvent of acetyl cellulose in the cold as it is of nitrocellulose, and that while methyl alcohol by itself is not a solvent of acetyl cellulose as it is of nitrocellulose, yet a mixture of camphor and methyl alcohol in certain proportions will dissolve acetyl cellulose of the variety named at the ordinary or room temperature, and that the addition of triphenylphosphate or tricresylphosphate or a similar substance, in about the proportions named, is possible, and will decrease the inflammability of the resultant product.

Of course, if desired, the methyl alcohol can be incorporated with the acetyl cellulose first, and the phosphates named and the camphor can be added subsequently to complete the solvent mixture, whereupon gelatinization takes place; or the acetyl cellulose, methyl alcohol and the phosphates may be mixed together first and the camphor subsequently added; but I prefer to mix the solids together first and subsequently add the liquids.

If it is desired to use a small proportion of the solids in order to produce a material having a high degree of hardness or solidity, and if this decrease in the amount of solids used results in the employment of a mixture having apparently little or no solvent action in the cold, gelatinizaton may be brought about by heating a mixture containing as low as even 10 parts of the other solids to 100 parts of acetyl cellulose and 50 or more parts of methyl alcohol. In other words, I have found that the conversion of my new compound takes place in the cold or at room temperature, but that the conversion is not deterred or hindered, but is on the other hand, rather aided by the application of heat up to 100° C.

Having thus described my invention, what I claim is:—

1. The process of dissolving or converting an acetyl cellulose that is soluble in acetone which consists in dissolving or converting said acetyl cellulose by the use of camphor and methyl alcohol in the presence of one or more of the group of phosphates described (triphenyl phosphate, tricresyl phosphate), substantially as set forth.

2. The process of dissolving or converting an acetyl cellulose that is soluble in acetone which consists in (1) mixing said acetyl cellulose with camphor and one or more of the group of phosphates described (triphenyl phosphate, tricresyl phosphate) and (2) adding methyl alcohol, substantially as set forth.

3. The process of dissolving or converting an acetyl cellulose that is soluble in acetone which consists in dissolving or converting said acetyl cellulose by the use of camphor and methyl alcohol in the presence of one or more of the group of phosphates described (triphenyl phosphate, tricresyl phosphate) together with coloring matters or other inert substances, substantially as set forth.

WILLIAM G. LINDSAY.

Witnesses:
J. E. HINDON HYDE,
MABEL DENTON.